United States Patent
Matsuoka et al.

(10) Patent No.: US 11,584,444 B2
(45) Date of Patent: Feb. 21, 2023

(54) B-PILLAR FOR VEHICLE

(71) Applicant: HONDA MOTOR CO., LTD., Tokyo (JP)

(72) Inventors: Kiyohiko Matsuoka, Guangzhou (CN); Kai Qiu, Guangzhou (CN)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/514,026

(22) Filed: Oct. 29, 2021

(65) Prior Publication Data

US 2022/0135139 A1 May 5, 2022

(30) Foreign Application Priority Data

Nov. 2, 2020 (CN) .......................... 202011205079.3

(51) Int. Cl.
*B62D 25/04* (2006.01)
*B62D 21/15* (2006.01)

(52) U.S. Cl.
CPC ........... *B62D 25/04* (2013.01); *B62D 21/157* (2013.01)

(58) Field of Classification Search
CPC ............................... B62D 25/04; B62D 21/157
USPC .......................... 296/193.06, 29, 30, 187.12
See application file for complete search history.

(56) References Cited

FOREIGN PATENT DOCUMENTS

CN 206493912 * 9/2017
CN 208069814 U 11/2018

* cited by examiner

*Primary Examiner* — Dennis H Pedder
(74) *Attorney, Agent, or Firm* — Amin, Turocy & Watson, LLP

(57) ABSTRACT

A B-pillar for a vehicle includes an inner plate and an outer plate disposed to be opposite to each other; and a first reinforcing plate, wherein the inner plate and the outer plate forms a cavity, the cavity being surrounded by the inner plate and the outer plate to extend in a vertical direction and have a closed cross section, the first reinforcing plate is disposed in an upper region of the cavity, the first reinforcing plate includes a first reinforcing segment and a second reinforcing segment to be connected with each other, a front edge and a rear edge of the first reinforcing segment are connected to an inner wall surface of the cavity, and a front edge or a rear edge of the second reinforcing segment is apart away from the inner wall surface of the cavity with an interval therebetween to form a notch portion.

7 Claims, 2 Drawing Sheets

B-PILLAR FOR VEHICLE

CROSS-REFERENCE TO RELATED APPLICATION

The priority is claimed based on a Chinese Patent Application No. 202011205079.3, filed on Nov. 2, 2020. The content of the Chinese Patent Application is incorporated herein by reference.

TECHNICAL FIELD

The present disclosure relates to a technical field of a vehicle. More specifically, the present disclosure relates to a B-pillar for a vehicle.

BACKGROUND ART

Generally, a B-pillar for a vehicle extends between a roof rail and a bottom locker of the vehicle in a direction from bottom to top of the vehicle. Basically, an upper portion of the B-pillar is formed to be delicate and provided with a seatbelt mounting hole such that the rigidity of the upper portion of the B-pillar is relatively low. When a collision occurs toward the lateral side of the vehicle occurs, the upper portion of the B-pillar is often deformed to be concave toward the inner side and fractured so as to cause the roof of the vehicle to be recessed and expose the occupant in the vehicle to danger.

According to the conventional technology, in order to improve the collision resistance strength in the lateral direction of the vehicle for resisting the collision from the lateral side of the B-pillar, generally, a reinforcing member is added to the B-pillar so as to significantly reduce the degree of the recess deformation of the B-pillar toward the vehicle interior space due to the external collision.

For example, a B-pillar for a vehicle is disclosed in Patent Document 1. The B-pillar for a vehicle disclosed in Patent Document 1 includes an inner plate and an outer plate being disposed to be opposite to each other, and a reinforcing plate. The reinforcing plate is positioned between an upper region of the outer plate and an upper region of the inner plate. A length direction of the reinforcing plate is coincided with either of a length direction of the inner plate or a length direction of the outer plate. In the upper region of the whole B-pillar, the outer plate, the reinforcing plate, and the inner plate are disposed in this sequence along a thickness direction of the B-pillar such that the strength of the upper region of the B-pillar for a vehicle is improved.

However, according to the B-pillar disclosed in Patent Document 1, when the collision to the lateral surface of the vehicle occurs, the inner plate and the outer plate are easy to be peeled from each other. Due to the reinforcing plate provided to the upper portion of the B-pillar, the rigidity of the whole B-pillar is significantly improved and in response, the deformation capability of the B-pillar is weaken. Accordingly, when the external collision is applied to the upper portion of the B-pillar and the external collision force is transmitted to the inner plate via the outer plate and the reinforcing plate, the rigidity of the inner plate that is connected to the outer plate with the reinforcing plate is increased such that it is difficult for the inner plate to be deformed. When an excessive collision force is applied to the upper portion of the inner plate, the inner plate and the outer plate are easy to be peeled from each other and bent toward the vehicle interior space to result in injury to the occupants inside the vehicle.

CITATION LIST

Patent Document

[Patent Document 1] Chinese Utility Model Application Publication No. 208069814U

SUMMARY

The present application is made in consideration of the above circumstances, and an objection of the present disclosure is to provide a B-pillar for preventing the fracture from the upper portion and preventing the peeling phenomenon occurred between the inner plate and the outer plate.

According to a first aspect of the present disclosure, a B-pillar for a vehicle is provided for resolving the above problem. The B-pillar for a vehicle includes an inner plate and an outer plate disposed to be opposite to each other, and a first reinforcing plate. The inner plate and the outer plate forms a cavity, and the cavity is surrounded by the inner plate and the outer plate to extend in a vertical direction and have a closed cross section. The first reinforcing plate is disposed in an upper region of the cavity. The first reinforcing plate includes a first reinforcing segment and a second reinforcing segment to be connected with each other, wherein a front edge and a rear edge of the first reinforcing segment are connected to an inner wall surface of the cavity, and a front edge or a rear edge of the second reinforcing segment is apart away from the inner wall surface of the cavity with an interval therebetween to form a notch portion.

According to the B-pillar having the above-described configuration, it is possible to effectively increase the strength of the upper portion of the B-pillar by adding the first reinforcing plate in the upper portion of the cavity.

Accordingly, when the vehicle receives the collision from the lateral side, it is possible to prevent the B-pillar from being fractured from the upper portion so as to prevent the roof portion of the vehicle from being recessed and resulting in injury to the occupants inside the vehicle. At the same time, the first reinforcing plate is divided into two parts, that is, the first reinforcing segment and the second reinforcing segment, and the front edge or the rear edge of the second reinforcing segment is apart away from the inner wall surface of the cavity with the interval therebetween to form the notch portion. According to the configuration, it is possible to suitably decrease the rigidity of the first reinforcing plate so as to decrease the rigidity of the upper portion of the B-pillar to some extent. As a result, when the B-pillar receives the collision from the lateral side, it is possible to prevent the inner plate and the outer plate from peeling from each other.

In the B-pillar according to the above-described first aspect, the second reinforcing segment may be positioned above the first reinforcing segment. Generally, when the collision from the lateral side occurs, a point receiving the maximum force in the B-pillar is at a position closer to the lower side in an intermediate portion of the B-pillar. According to the configuration, by disposing the second reinforcing segment in the upper segment of the first reinforcing plate, it is possible to make the notch portion formed between the first reinforcing plate and the inner wall surface of the cavity to be positioned in the upper portion of the B-pillar. Accordingly, by making the notch portion to be away from the point receiving the maximum force in the B-pillar when the B-pillar receives the collision from the lateral side, the influence to the collision resistance strength of the whole B-pillar is significantly reduced.

In the B-pillar according to the above-described first aspect, the front edge of the second reinforcing segment may be apart away from the inner wall surface of the cavity with the interval to form the notch portion, and the rear edge of the second reinforcing segment may be connected to the inner wall surface of the cavity. According to the configuration, the notch portion is positioned at the front side of the upper portion of the first reinforcing plate (the side close to the front side of the vehicle). Generally, the B-pillar is slightly inclined toward the rear side of the vehicle such that when the vehicle is overturned, the load applied to the portion of the B-pillar closer to the rear side of the vehicle is large. According to the above-described configuration, the interval is only formed between the inner wall of the cavity and the front edge of the second reinforcing segment, and the notch portion is positioned at the front side (the side close to the front side of the vehicle) of the first reinforcing plate. As a result, by configuring the notch portion to be away from the portion of the B-pillar where the load is large when the vehicle is overturned, it is possible to ensure the sufficient support strength by the B-pillar to the roof portion of the vehicle even when the vehicle is overturned.

The B-pillar according to the above-described first aspect may further include a second reinforcing plate disposed inside the cavity, wherein a front edge and a rear edge of the second reinforcing plate may be connected to an inner wall surface of the cavity, and a horizontal height of an upper end of the second reinforcing plate may be lower than a horizontal height of an upper end of the second reinforcing segment. It is possible to further improve the collision resistance capability of the B-pillar by adding the second reinforcing plate. At the same time, by setting the horizontal height of the upper end of the second reinforcing plate to be lower than the horizontal height of the upper end of the second reinforcing segment, it is possible to prevent the rigidity of the upper portion of the B-pillar from increasing beyond necessity by the second reinforcing plate so as to prevent the inner plate and the outer plate from peeling from each other when the B-pillar receives the collision from the lateral side.

According to a second aspect of the present disclosure, in the B-pillar for a vehicle, a seatbelt mounting hole is provided in the first reinforcing plate. According to the configuration, it is possible to mount the seatbelt into the B-pillar.

In the B-pillar according to the second aspect, the seatbelt mounting hole may be disposed in the first reinforcing segment. It is possible to make the notch portion to be away from the position of the seatbelt mounting hole by disposing the seatbelt mounting hole in the first reinforcing segment of the first reinforcing plate. As a result, it is possible to avoid the situation in which the strength of the B-pillar at the position corresponding to the seatbelt mounting hole is weaken by forming the notch portion therein and it is possible to make the B-pillar to be capable of withstanding the pulling force of the seatbelt.

According to a third aspect of the present disclosure, the front edge and the rear edge of the first reinforcing segment of the first reinforcing plate are in close contact with an inner surface of the inner plate and fixed to the inner surface of the inner plate. The first reinforcing segment is in close contact with the inner surface of the inner plate and fixed thereto so as to increase the thickness of the inner plate at the corresponding position and increase the strength of the inner plate. As a result, the strength of the B-pillar is improved such that it is possible to withstand the higher pressing force and improve the safety of the vehicle.

Advantageous Effects of Invention

According to the above-described aspects of the present disclosure, the B-pillar for a vehicle at least provides the following advantageous effects.

By providing the first reinforcing plate in the upper portion of the cavity formed in the B-pillar, it is possible to effectively increase the strength of the upper portion of the B-pillar. As a result, when the vehicle receives the collision from the lateral side, it is possible to prevent the B-pillar from being fractured from the upper portion so as to prevent the roof portion of the vehicle from being recessed and resulting in injury to the occupants inside the vehicle. At the same time, by dividing the first reinforcing plate into two parts, that is, the first reinforcing segment and the second reinforcing segment, and forming the notch portion between the front edge or the rear edge of the second reinforcing segment and the inner wall surface of the cavity with the interval therebetween, it is possible to suitably decrease the rigidity of the first reinforcing plate so as to decrease the rigidity of the upper portion of the B-pillar to some extent. As a result, when the B-pillar receives the collision from the lateral side, it is possible to prevent the inner plate and the outer plate from peeling from each other.

By disposing the second reinforcing segment in the upper segment of the first reinforcing plate, the notch portion formed between the first reinforcing plate and the inner wall surface of the cavity is positioned in the upper portion of the B-pillar. According to the configuration, it is possible to make the notch portion to be away from the point receiving the maximum force in the B-pillar when the B-pillar receives the collision from the lateral side. As a result, the influence to the collision resistance strength of the whole B-pillar is significantly reduced.

The interval is only formed between the inner wall of the cavity and the front edge of the second reinforcing segment, and the notch portion is positioned at the front side of the upper portion of the first reinforcing plate (the side close to the front side of the vehicle). According to the configuration, it is possible to configure the notch portion to be away from the portion of the B-pillar where the load is large when the vehicle is overturned so as to ensure the sufficient support strength by the B-pillar to the roof portion of the vehicle even when the vehicle is overturned.

By disposing the seatbelt mounting hole in the first reinforcing segment of the first reinforcing plate, it is possible to make the notch portion to be away from the position of the seatbelt mounting hole. According to the configuration, the strength at the position where the seatbelt mounting hole is formed in the B-pillar is not weaken due to the notch portion such that it is possible for the B-pillar to be able to withstand the pulling force of the seatbelt.

DESCRIPTION OF EMBODIMENTS

In order to make the technical problem, the solutions and the effects of the present application more clear, hereinafter, embodiments of the present application will be described with reference to the figures. Hereinafter, the following embodiments are only used to describe the present application and are not used to limit the present application. Also, the configurations described in figures are only specific examples of the present application and the person with ordinary skill in the art can achieve other figures based on the enclosed figures of the present application.

In the following description, it is noted that the terms "upper", "lower", "front", and "rear" should be understood with reference to the vehicle. For example, the term. "upper" refers to the direction toward the roof portion of the vehicle, the term "lower" refers to the direction toward the bottom portion of the vehicle, the term "front" refers to the direction toward the vehicle head, and the term "rear" refers to the direction toward the vehicle tail. Such terms are only used for easily describing the directions and positional relationships based on the enclosed figures. Such terms are not used to indicate or implicit the apparatus and the element thereof have the particular directions and positions, to be configured and operated in the particular directions and at the specific positions, such that the present disclosure is not limited by these terms. For a person with ordinary skill in the art, the specific meaning of the above-mentioned terms may be suitably understood according to the actual situation. The terms "first", "second", and "third" are only used for making the description easy to understand, and they are not used to indicate or implicit the importance of the configurations or implicit the amount of the technical features. Unless otherwise defined, the term "a plurality of" means that an amount equal to two or more than two.

In the following description, unless otherwise defined, the terms "attach", "communicate", "connect" or the like should be broadly understood. For example, according to such terms, it is possible to perform a fixedly connection, or a detachably connection, or an integrally connection. Also, a mechanical connection may be performed while an electrical connection may be performed. Furthermore, a direct connection, an indirect connection via an intermediate media, or a connection connecting the inside of two elements may be performed. For a person with ordinary skill in the art, the specific meaning of the above-mentioned terms may be suitably understood according to the actual situation.

According to the present embodiment, a preferable example of a B-pillar for a vehicle is provided.

Figure 1:
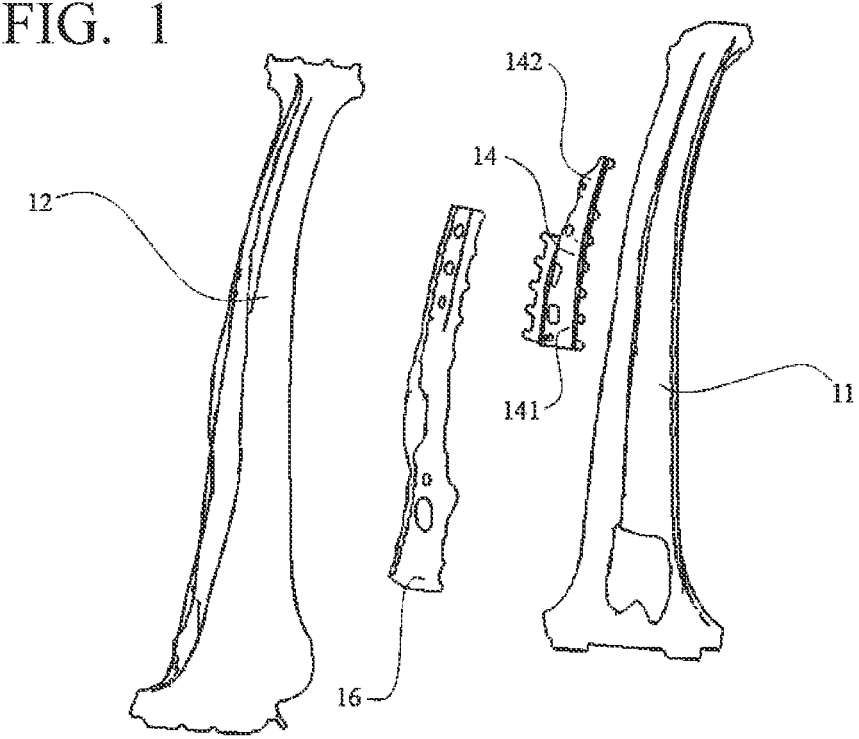
FIG. 1 is a three-dimensional assembly schematic view of a B-pillar according to the present disclosure.
Figure 2:
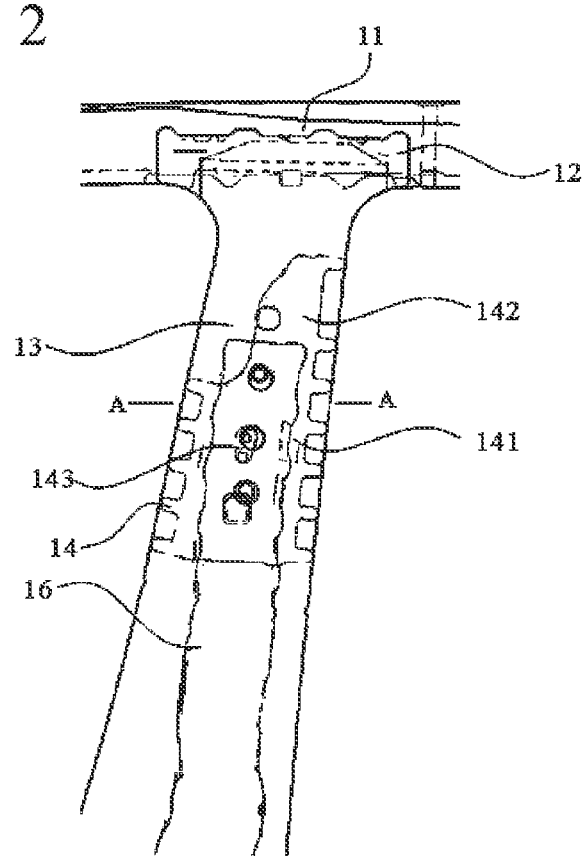
FIG. 2 is a perspective view of the B-pillar according to the present disclosure.
Figure 3:
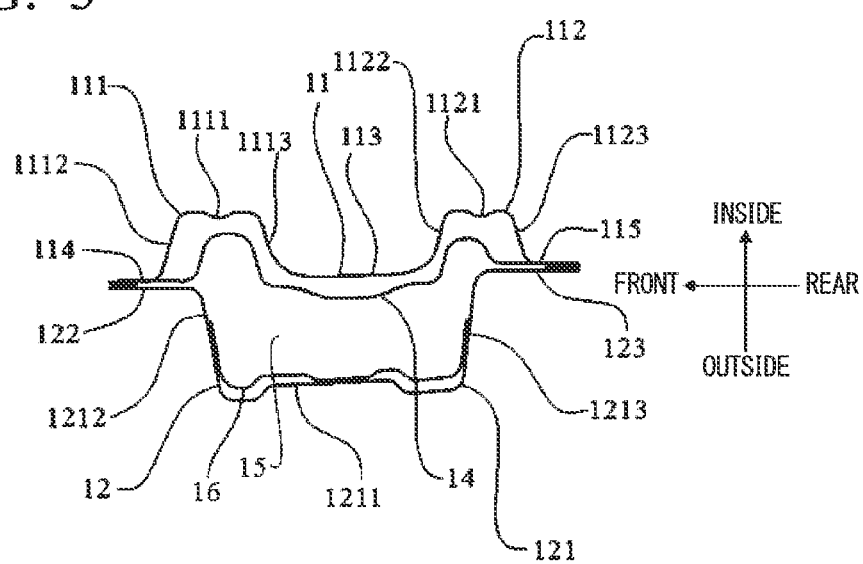
FIG. 3 is a cross-sectional view along the line A-A in FIG. 2.

As shown in FIG. 1 to FIG. 3, in the present example, the B-pillar includes an inner plate 11 and an outer plate 12 which are disposed to be opposite to each other. The inner plate 11 and the outer plate 12 surrounds a space to form a cavity 15, wherein the cavity 15 extends along a vertical up-down direction and has a closed cross section. The B-pillar further includes a reinforcing plate (first reinforcing plate) 14 disposed in the upper region inside the cavity 15. The reinforcing plate 14 includes a first reinforcing segment 141 and a second reinforcing segment 142 connected with each other. Each of a front edge and a rear edge of the first reinforcing segment 141 is connected to an inner wall surface of the cavity 15. A front edge or a rear edge of the second reinforcing segment 142 and the inner wall surface of the cavity 15 are apart away from each other with an interval therebetween to form a notch portion 13.

As shown in FIG. 3, in the present embodiment, the inner plate 11 is formed in an elongated shape along the vertical up-down direction. The inner plate 11 includes a first protrusion portion 111 protruding inwardly and extending in the vertical direction and a second protrusion portion 112 protruding inwardly and extending in the vertical direction. The first protrusion portion 111 includes a first inner wall 1111, a first side wall 1112 being bent outwardly from a front edge of the first inner wall 1111 to extend, and a second side wall 1113 being bent outwardly from a rear edge of the first inner wall 1111 to extend. The second protrusion portion 112 includes a second inner wall 1121, a third side wall 1122 being bent outwardly from a front edge of the second inner wall 1121 to extend, and a fourth side wall 1123 being bent outwardly from a rear edge of the second inner wall 1121 to extend. The inner plate 11 further includes an intermediate connection wall 113 connecting the third side wall 1122 and the second side wall 1113, a first flange 114 connected to the first side wall 1112, and a second flange 115 connected to the fourth side wall 1123. Correspondingly, the outer plate 12 is formed in an elongated shape along the vertical up-down direction. The outer plate 12 includes a third protrusion portion 121 protruding outwardly and extending in the vertical direction. The third protrusion portion 121 includes a first outer wall 1211, a fifth side wall 1212 being bent inwardly from a front edge of the first outer wall 1211 to extend, and a sixth side wall 1213 being bent inwardly from a rear edge of the first outer wall 1211 to extend. The outer plate 12 further includes a third flange 122 connected to the fifth side wall 1212, and a fourth flange 123 connected to the sixth side wall 1213. The first flange 114 and the second flange 115 of the inner plate 11 are fixedly connected with the third flange 122 and the fourth flange 123 of the outer plate 12 in close contact with each other, respectively. According to the configuration, the inner plate 11 and the outer plate 12 surround a space to form a cavity 15 extending in the vertical up-down direction and having a closed cross section.

According to the present embodiment, as shown in FIG. 2 and FIG. 3, the reinforcing plate 14 is formed in a short plate shape, and a length direction of the reinforcing plate 14 coincides with the extending direction of the inner plate 14. The second reinforcing segment 142 is positioned above the first reinforcing segment 141. At the same time, a width of the second reinforcing segment is shorter than a width of the first reinforcing segment 141. The front edge and the rear edge of the first reinforcing segment 141 are in close contact with the side toward the outer plate 12 side in the first flange 114 and the second flange 115 of the inner plate 11 and fixed thereto. More specifically, the front edge of the first reinforcing segment 141 is fixed to the side of the first flange 114 in the inner plate 11 toward the outer plate 12 side by welding. The rear edge of the first reinforcing segment 141 is fixed to the side of the second flange 115 in the inner plate 11 toward the outer plate 12 side by welding. The rear edge of the second reinforcing segment 142 is in close contact with the side toward the outer plate 12 side in the inner plate 11 and fixed thereto. More specifically, the rear edge of the second reinforcing segment 142 is in close contact with the side of the second flange 115 in the inner plate 11 toward the outer plate 12 side by welding. The front edge of the second reinforcing segment 142 and the inner wall surface of the cavity 15 are apart away from each other to have the interval therebetween so as to form the notch portion 13. In other words, the front edge of the second reinforcing segment is not connected with the inner plate 11 and the outer plate 12.

According to the above-described configuration, it is possible to effectively increase the strength of the upper portion of the B-pillar by adding the reinforcing plate 14 in the upper portion of the cavity 15. As a result, when the vehicle receives the collision from the lateral side, it is possible to prevent the B-pillar from being fractured from the upper portion so as to prevent the roof portion of the vehicle from being recessed and resulting in injury to the occupants inside the vehicle. Furthermore, for example, the reinforcing plate 14 is divided into two parts, that is, the adjacent first reinforcing segment 141 and the second reinforcing segment 142, and the front edge or the rear edge of the second reinforcing segment 142 is apart away from the inner wall surface of the cavity 15 with the interval therebetween to form the notch portion 13. According to the configuration, it is possible to suitably decrease the rigidity of the reinforcing plate 14 so as to decrease the rigidity of the upper portion of the B-pillar to some extent. As a result, when the B-pillar receives the collision from the lateral side, it is possible to prevent the inner plate 11 and the outer plate 12 from peeling from each other. It is possible to save the material cost for forming the reinforcing plate 14 while decreasing the weight of the vehicle by forming the notch portion 13.

According to the present embodiment, the second reinforcing segment 142 is disposed to be positioned above the first reinforcing segment 141. Generally, when the collision from the lateral side occurs, a point receiving the maximum force in the B-pillar is at a position closer to the lower side in an intermediate portion of the B-pillar. According to the configuration, by disposing the second reinforcing segment 142 in the upper segment of the reinforcing plate 14, it is possible to make the notch portion 13 formed between the reinforcing plate 14 and the inner wall surface of the cavity 15 to be positioned in the upper portion of the B-pillar. According to the configuration, it is possible to make the notch portion 13 to be away from the point receiving the maximum force in the B-pillar when the B-pillar receives the collision from the lateral side. As a result, the influence of the notch portion 13 to the collision resistance strength of the whole B-pillar is significantly reduced.

According to the present embodiment, the notch portion 13 is formed between the front edge of the second reinforcing segment 142 and the inner wall surface of the cavity 15. According to the configuration, the notch portion 13 is positioned at the front side in the upper portion of the reinforcing plate 14 (at the side close to the front side of the vehicle). Generally, the B-pillar is slightly inclined toward the rear side of the vehicle such that when the vehicle is overturned, the load applied to the portion of the B-pillar closer to the rear side of the vehicle is large. According to the configuration in which the notch portion 13 is positioned at the front side in the upper portion of the reinforcing plate 14 (at the side close to the front side of the vehicle), when the vehicle is overturned, it is possible to make the notch portion 13 to be away from the position in the B-pillar where the load is large. As a result, it is possible to ensure the sufficient support strength by the B-pillar to the roof portion of the vehicle even when the vehicle is overturned.

Furthermore, in the present embodiment, the front edge of the first reinforcing segment 141 is in close contact with the side in the first flange 114 of the inner plate 11 toward the outer plate 12 side by welding, and the rear edge of the first reinforcing segment 141 is in close contact with the side in the second flange 115 of the inner plate 11 toward the outer plate 12 side by welding. According to the configuration, in the inner plate 11, the thickness at the position corresponding to the first flange 114 and the second flange 115 is increased such that the strength of the inner plate 11 is improved in some extent. As a result, it is possible to withstand the higher pressing force and improve the safety of the vehicle by improving the strength of the B-pillar.

According to the present embodiment, the B-pillar further includes a reinforcing plate (second reinforcing plate) 16 provided in the cavity 15. The front edge and the rear edge of the reinforcing plate 16 are connected to the inner wall surface of the cavity 15. A horizontal height of the upper end of the reinforcing plate 16 is lower than a horizontal height of the upper end of the second reinforcing segment 142. More specifically, the reinforcing plate 16 is formed in the elongated shape, and the length direction is coincided with the extending direction of the inner plate 11. The reinforcing plate 16 is positioned between the reinforcing plate 14 and the outer plate 12. The front side and the rear side of the reinforcing plate 16 are directly connected to the fifth side wall 1212 and the sixth side wall 1213 by welding, respectively. It is more preferable that the horizontal height of the upper end of the reinforcing plate 16 is lower than the horizontal height of the midpoint of the second reinforcing segment 142. It is possible to further improve the collision resistance capability of the B-pillar by adding the reinforcing plate 16. At the same time, by setting the horizontal height of the upper end of the horizontal plate 16 to be lower than the horizontal height of the upper end of the second reinforcing segment 142, it is possible to prevent the rigidity of the upper portion of the B-pillar from increasing beyond necessity by the reinforcing plate 16 so as to prevent the inner plate 11 and the outer plate 12 from peeling from each other when the B-pillar receives the collision from the lateral side.

Furthermore, in the B-pillar according to the present embodiment, a seatbelt mounting hole 143 is formed in the reinforcing plate 14. It is more preferable that the seatbelt mounting hole 143 is positioned in the first reinforcing segment 141. It is possible to make the notch portion 13 to be away from the position of the seatbelt mounting hole 143 by disposing the seatbelt mounting hole 143 in the first reinforcing segment 141 of the reinforcing plate 14. According to the configuration, it is possible to avoid the situation in which the strength of the B-pillar at the position corresponding to the seatbelt mounting hole 143 is weaken by forming the notch portion 13 therein and it is possible to make the B-pillar to be capable of withstanding the pulling force of the seatbelt.

In another embodiment, both of the front edge and the rear edge of the second reinforcing segment 142 may be apart away from the inner wall surface of the cavity 15 with the interval therebetween to form the notch portion 13. In other words, the notch portion 13 is formed in the front side and the rear side of the second reinforcing segment 142. Comparing with the present embodiment, it is possible to further decrease the rigidity of the upper portion of the B-pillar by decreasing the rigidity of the reinforcing plate 14. As a result, it is possible to more effectively prevent the inner plate 11 and the outer plate 12 of the B-pillar from peeling from each other. It is possible to further reduce the material cost of the reinforcing plate 14 and further decrease the weight of the vehicle.

In another embodiment, the rear edge of the second reinforcing segment 142 may be apart away from the inner wall surface of the cavity 15 with the interval therebetween to form the notch portion 13, and the front edge of the second reinforcing segment 142 may be connected to the inner wall surface of the cavity 15. According to the configuration, the notch portion 13 is positioned at the rear side of the second reinforcing segment 142. Similar to the present embodiment, according to the configuration, it is possible to improve the strength of the B-pillar while preventing the inner plate 11 and the outer plate 12 of the B-pillar from peeling from each other.

In another embodiment, the second reinforcing segment 142 may be disposed below the first reinforcing segment

141. Similar to the present embodiment, according to the configuration, it is possible to improve the strength of the B-pillar while preventing the inner plate 11 and the outer plate 12 of the B-pillar from peeling from each other.

Although the respective embodiments and modifications of the present disclosure have been described above, the technical scope of the present disclosure is not limited to the above-described embodiments, and configurations in the respective embodiments and modifications within the scope not departing from the spirit of the present disclosure. It is possible to change the combination of elements, make various changes to each configuration element, or delete each configuration element. The present disclosure is not limited by the above description, and is only limited by the appended claims.

REFERENCE SIGNS LIST

11 inner plate
12 outer plate
13 notch portion
14 first reinforcing plate
141 first reinforcing segment
142 second reinforcing segment
15 cavity
111 first protrusion portion
112 second protrusion portion
1111 first inner wall
1112 first side wall
1113 second side wall
1121 second inner wall
1122 third side wall
1123 fourth side wall
113 intermediate connection wall
114 first flange
115 second flange
121 third protrusion portion
1211 first outer wall
1212 fifth side wall
1213 sixth side wall
122 third flange
123 fourth flange
16 second reinforcing plate
143 seatbelt mounting hole

What is claimed is:

1. A B-pillar for a vehicle, comprising:
    an inner plate and an outer plate disposed to be opposite to each other; and
    a first reinforcing plate,
    wherein the inner plate and the outer plate forms a cavity, the cavity being surrounded by the inner plate and the outer plate to extend in a vertical direction and have a closed cross section,
    the first reinforcing plate is disposed in an upper region of the cavity,
    the first reinforcing plate includes a first reinforcing segment and a second reinforcing segment to be connected with each other,
    a front edge and a rear edge of the first reinforcing segment are connected to an inner wall surface of the cavity, and
    a front edge or a rear edge of the second reinforcing segment is apart away from the inner wall surface of the cavity with an interval therebetween to form a notch portion.

2. The B-pillar for a vehicle according to claim 1, wherein the second reinforcing segment is positioned above the first reinforcing segment.

3. The B-pillar for a vehicle according to claim 2,
    wherein the front edge of the second reinforcing segment is apart away from the inner wall surface of the cavity with the interval to form the notch portion, and
    the rear edge of the second reinforcing segment is connected to the inner wall surface of the cavity.

4. The B-pillar for a vehicle according to claim 2, further comprising a second reinforcing plate disposed inside the cavity,
    wherein a front edge and a rear edge of the second reinforcing plate are connected to an inner wall surface of the cavity, and
    a horizontal height of an upper end of the second reinforcing plate is lower than a horizontal height of an upper end of the second reinforcing segment.

5. The B-pillar for a vehicle according to claim 1, wherein a seatbelt mounting hole is disposed in the first reinforcing plate.

6. The B-pillar for a vehicle according to claim 5, wherein the seatbelt mounting hole is disposed in the first reinforcing segment.

7. The B-pillar for a vehicle according to claim 1, wherein the front edge and the rear edge of the first reinforcing segment of the first reinforcing plate are in close contact with an inner surface of the inner plate and fixed to the inner surface of the inner plate.

* * * * *